June 21, 1949.  C. C. SHILLING  2,473,732
VEHICLE SPRINGING ASSEMBLY
Filed July 23, 1946
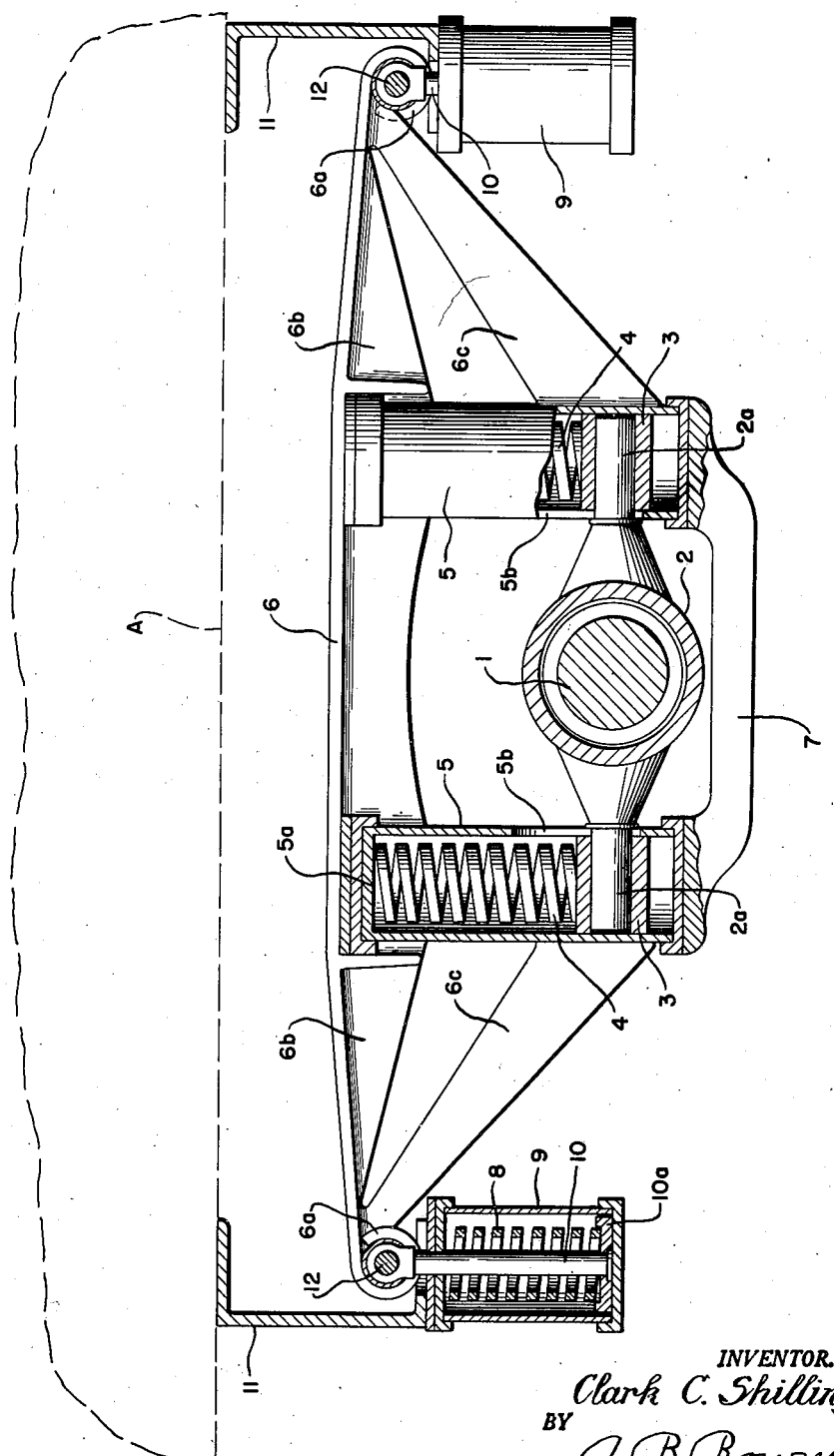
INVENTOR.
Clark C. Shilling,
BY
A. B. Bowman
Attorney Patented June 21, 1949

2,473,732

UNITED STATES PATENT OFFICE 2,473,732

VEHICLE SPRINGING ASSEMBLY

Clark C. Shilling, San Diego, Calif.

Application July 23, 1946, Serial No. 685,707

3 Claims. (Cl. 267—60)

1

My invention relates to a vehicle springing assembly, more particularly for use in connection with automobiles or other similar vehicles and the objects of my invention are:

First, to provide a vehicle springing assembly of this class which provides extremely soft riding action of the vehicle equipped therewith when passing over irregular and bumpy roads;

Second, to provide a springing assembly of this class in which the vehicle axle is acted upon by springs of graduated tension providing very soft and comfortable riding qualities to a vehicle equipped therewith;

Third, to provide a vehicle springing assembly of this class in which the springs thereof are encased for the exclusion of the elements therefrom;

Fourth, to provide a vehicle springing assembly of this class in which spring casings having springs therein are positioned at opposite sides of the axle being acted upon thereby, whereby torsion as well as lateral movement of said axle is cushioned by said springs;

Fifth, to provide a vehicle springing assembly of this class in which fore and aft shock loads transmitted by the vehicle axle are cushioned by graduated springs in series disposed laterally of the axle in spaced relation to each other; and Sixth, to provide a vehicle springing assembly of this class which is very simple and economical of construction in accordance with its utility, efficient in operation, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, forming a part of this application in which:

The figure of the drawing is a side elevational view of a single unit of my vehicle springing assembly showing portions thereof broken away and in section to amplify the illustration and showing the same in connection with a vehicle axle and frame.

Similar characters of reference refer to similar parts and portions throughout the drawing.

The axle 1, axle housing 2, bearings 3, springs 4, spring casings 5, bridge 6, brace 7, springs 8, spring casings 9, plungers 10, brackets 11 and the pins 12 constitute the principal parts and portions of my vehicle springing assembly.

The vehicle frame, as shown by dash lines in the drawing, may be any conventional automobile or other vehicle frame. The axle 1, as shown in the drawing, is a rotating axle. However, the axle housing 2 may be connected to a stationary front axle if desired. The axle housing 2 is provided with projecting laterally disposed trunnion portions 2a in opposed relation to each other which extend inwardly of the spring casings 5 into engagement with the bearings 3, at the upper side of which the springs 4 are engaged. These springs 4 are substantially conventional helical wire springs and are abutted in the normally upper end portions 5a of the spring casing 5. It will be noted that the trunnions 2a extend through longitudinally slotted portions 5b of the spring casings 5 of sufficient length to accommodate flexure of the springs 4. The bridge 6 interconnects the spring casings 5 and the brace 7 rigidly interconnects the opposite ends of the spring casings 5 at the opposite side of the axle housing from the bridge 6. Opposite ends of the bridge 6 are provided with eye portions 6a in which the pins 12 are journaled. The plungers 10 are secured on the pins 12 at one end and engage the springs 8 at their opposite ends and are reciprocally mounted in the spring casings 9. These spring casings 9 are rigidly connected to the frame A of the vehicle by the brackets 11. It will be here noted that the plungers 10 are each provided with a head portion 10a, substantially larger in diameter than the springs 8 which are conventional helical wire springs. The bridge 6 is provided with angular brace portions 6b and 6c which interconnect the eye portions 6a and the spring casings 5.

The operation of my vehicle springing assembly is substantially as follows:

When the vehicle to which my vehicle springing assembly is connected, passes over uneven rough roads shock of the vehicle wheels transmitted to the axle 1 is transmitted to the springs 4 by means of the trunnions 2a engaging the bearings 3. Initial compression of the springs 4 is followed by compression of the springs 8 after a predetermined deflection of the springs 4 has taken place. Torsional shock in connection with the axle housing 2 is cushioned by the springs 4 in the casings 5 and further by the springs 8 in the casings 9. The brackets 11 maintain the casings 9 in fixed relation to the frame A of the vehicle. It will be here noted that each wheel of a vehicle may be sprung by the vehicle springing assembly as shown in the drawing. When a bump in the road causes the axle 1 to be forced toward the frame A, the springs 4 are compressed in the casings 5 to a predetermined load whereupon the springs 8 are compressed in the casings 9 by movement of the plungers 10 together with the pins 12 toward the frame A. As the axle housing 2 passes upwardly toward the frame A of the vehicle, the trunnion portions 2a reciprocate in the slotted portions 5b of the casings 5. The brace 7 stiffens the bridge 6 preventing the same from yieldinng when bumps are encountered by the wheels in connection with the axle 1.

Though I have shown and described a particular construction, combination and arrangement of parts and portions, I do not wish to be limited to the particular construction, combination and arrangement but desire to include in the scope of my invention, the construction, combination and arrangement substantially as set forth in the appended claims.

Having thus described my invention what I claim as new and desire to secure by Letters Patent is:

1. In a vehicle springing assembly of the class described, the combination with a conventional vehicle frame and axle of laterally extending opposed trunnion portions in connection with said axle, springs engaging the upper portions of said trunnion portions, a bridge extending laterally at opposite sides of said axle above the same and supporting said springs, secondary springs outwardly of said first mentioned springs supported by said frame and engaged by opposite ends of said bridge, plungers internally of said second mentioned springs pivotally connected to opposite ends of said bridge, casings supporting said second mentioned springs secured to said frame, and casings for said first mentioned springs secured to said bridge having slotted portions in the side walls thereof in which said trunnions are reciprocally mounted.

2. In a vehicle springing assembly of the class described, the combination with a vehicle frame and axle of a bridge transversely disposed relatively to said axle and extending at opposite sides thereof, opposed laterally extending trunnion portions in connection with said axle, springs engaging said trunnion portions and said bridge at opposite sides of said axle, and casings on said bridge for said springs having longitudinally slotted portions therein in which said trunnion portions are reciprocally mounted.

3. In a vehicle springing assembly of the class described, the combination with a vehicle frame and axle of a bridge transversely disposed relatively to said axle and extending at opposite sides thereof, opposed laterally extending trunnion portions in connection with said axle, springs engaging said trunnion portions and said bridge at opposite sides of said axle, casings on said bridge for said springs having longitudinally slotted portions therein in which said trunnion portions are reciprocally mounted, second springs stationarily connected with said frame, plungers pivotally connected with opposite ends of said bridge engaging opposite ends of said second mentioned springs from the connection thereof with said frame.

CLARK C. SHILLING.

REFERENCES CITED

The following references are of record in the file of this patent:

UNITED STATES PATENTS

| Number | Name | Date |
|---|---|---|
| 1,464,524 | Gilmour | Aug. 14, 1923 |
| 2,072,778 | Thomson | Mar. 2, 1937 |

FOREIGN PATENTS

| Number | Country | Date |
|---|---|---|
| 39,368 | Austria | Oct. 25, 1909 |
| 345,100 | Great Britain | Mar. 19, 1931 |